E. S. Winchester,
Tip for Chair-Feet,
No. 3,187. Reissued Nov. 10, 1868.
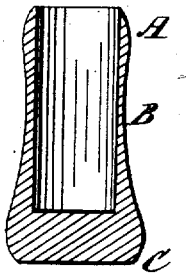
Witnesses.
J. B. Crosby
J. Frank Newman
Inventor
Edward S. Winchester

United States Patent Office.

EDWARD S. WINCHESTER, OF BOSTON, MASSACHUSETTS.

*Letters Patent No.* 70,490, *dated November* 5, 1867; *reissue No.* 3,187, *dated November* 10, 1868.

IMPROVED TIP FOR THE FEET OF CHAIR-LEGS.

The Schedule referred to in these Letters Patent and making part of the same

*To all whom it may concern:*

Be it known that I, EDWARD S. WINCHESTER, of Boston, in the county of Suffolk, and State of Massachusetts, have invented a new and useful Improvement in Tips or Feet for the Legs of Chairs; and I do hereby declare that the following is a full and exact description thereof, reference being had to the accompanying drawing, and to the letters of reference marked thereon.

With reference to the drawing, which is a sectional view, the part designated by the letter C represents that part of the tip or foot which, in use, is interposed between the chair-leg and the floor, or other surface upon which it may be used.

From the part C extends the rim, socket, or ferrule part, to embrace the lower part or foot of the chair-leg. This rim, socket, or ferrule part, need not be restricted as to form, except that it is joined to the part C, all around the space reserved within, of proper form to receive the lower part or foot of the chair-leg. The rim, socket, or ferrule part is marked A B, and the principle of its operation is to hold the lower foot part C, by a continuous connection all around the outside, firmly to the leg or foot of the chair, while it also embraces the lower portion of the leg or foot of the chair, or a reduced extremity thereof, so as to protect it from checking, splitting, or other injury, by enclosing it within itself.

When applied, the rim or socket embracing the leg or foot, as described, holds the part C very firmly in its position, without liability to tip to one side. It also secures it firmly to the chair-leg with or without the use of any adhesive agent other than the contractile power of the rim or socket. The whole is made of vulcanized rubber, or other elastic or semi-elastic material, so that it serves the triple purpose of protecting the lower end or foot of the chair-leg, and the floor on which it is used from injury, and gives, also, elasticity to the action of the chair.

*Claim.*

Believing this external or annular connection of the elastic tip or cushion to the foot of the chair to be new and original with me, I therefore claim as my own invention, and desire to secure by Letters Patent, the following, viz:

An elastic foot or tip of rubber, or other material, for the leg of a chair, having its means of attachment in an external rim, made to embrace the lower portion of the leg or foot of a chair, substantially as described.

EDWARD S. WINCHESTER.

Witnesses:

IRAH D. SPAULDING,
LEONE C. BADGER.